United States Patent [19]
Saurwein

[11] Patent Number: 5,528,984
[45] Date of Patent: Jun. 25, 1996

[54] SMOKER INSERT FOR GAS BARBECUES

[76] Inventor: Albert C. Saurwein, 251 Gurley Rd., Granger, Wash. 98932

[21] Appl. No.: 492,775

[22] Filed: Jun. 21, 1995

Related U.S. Application Data

[63] Continuation-in-part of Ser. No. 231,758, Apr. 25, 1994, abandoned.

[51] Int. Cl.$^6$ ............................ A47J 37/00; A62C 3/00
[52] U.S. Cl. ........................ 99/482; 99/446; 99/467; 99/339; 99/444; 126/25 R; 126/27; 167/65
[58] Field of Search ............................ 99/482, 446, 447, 99/444, 339–341, 467, 473, 477, 479–481; 126/17, 18, 27, 28, 67, 79, 25 R, 9 R; 169/65

[56] References Cited

U.S. PATENT DOCUMENTS

| | | | |
|---|---|---|---|
| 3,683,791 | 8/1972 | Rast, Jr. | 99/340 |
| 3,882,767 | 5/1975 | Oyler et al. | 99/339 |
| 3,967,613 | 7/1976 | Rybak | 126/41 R |
| 4,201,125 | 5/1980 | Ellis | 99/446 |
| 4,213,381 | 7/1980 | Ellis | 99/446 |
| 4,348,948 | 9/1982 | Allison | 99/339 |
| 4,355,570 | 10/1982 | Martin et al. | 99/446 |
| 4,554,864 | 11/1985 | Smith et al. | 99/340 |
| 4,630,593 | 12/1986 | Gremillion | 126/25 R |
| 4,934,260 | 6/1990 | Blevins | 99/482 |
| 5,111,803 | 5/1992 | Barker et al. | 126/41 R |
| 5,163,358 | 11/1992 | Hanagan et al. | 99/339 |
| 5,191,831 | 3/1993 | Walden | 99/446 |
| 5,195,423 | 3/1993 | Beller | 99/340 |
| 5,353,880 | 10/1994 | Green | 169/65 |

*Primary Examiner*—David Scherbel
*Assistant Examiner*—Patrick F. Brinson
*Attorney, Agent, or Firm*—Harry M. Cross, Jr.

[57] ABSTRACT

A smoker insert for a gas barbecue comprises a drip pan designed to be supported by the lower grate of a gas barbecue, and a vertical baffle extending from the drip pan upwards to subdivide the cooking compartment. The drip pan is sized to fit on about ½ of the lower grate area so that the baffle subdivides the cooking compartment about in half. The baffle occupies a very substantial portion of the cross-section of the cooking compartment so that the side and top edges of the baffle are close to the inner surfaces of the lower shell and the closed barbecue lid. By this arrangement, a small clearance is provided around the drip pan and the baffle, between the insert and the inner surfaces of the lower shell and closed lid. A flame suppressor is provided to control flames and flame-ups.

10 Claims, 8 Drawing Sheets

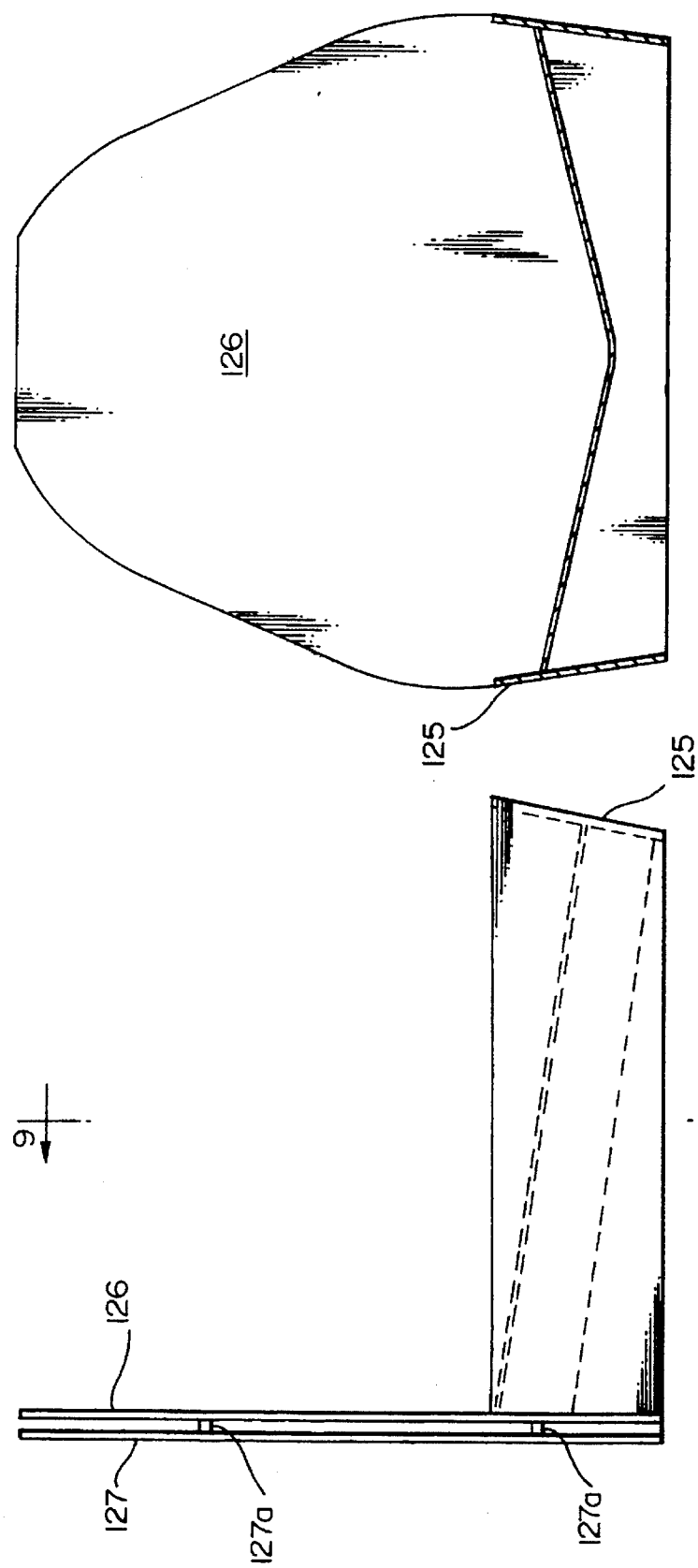

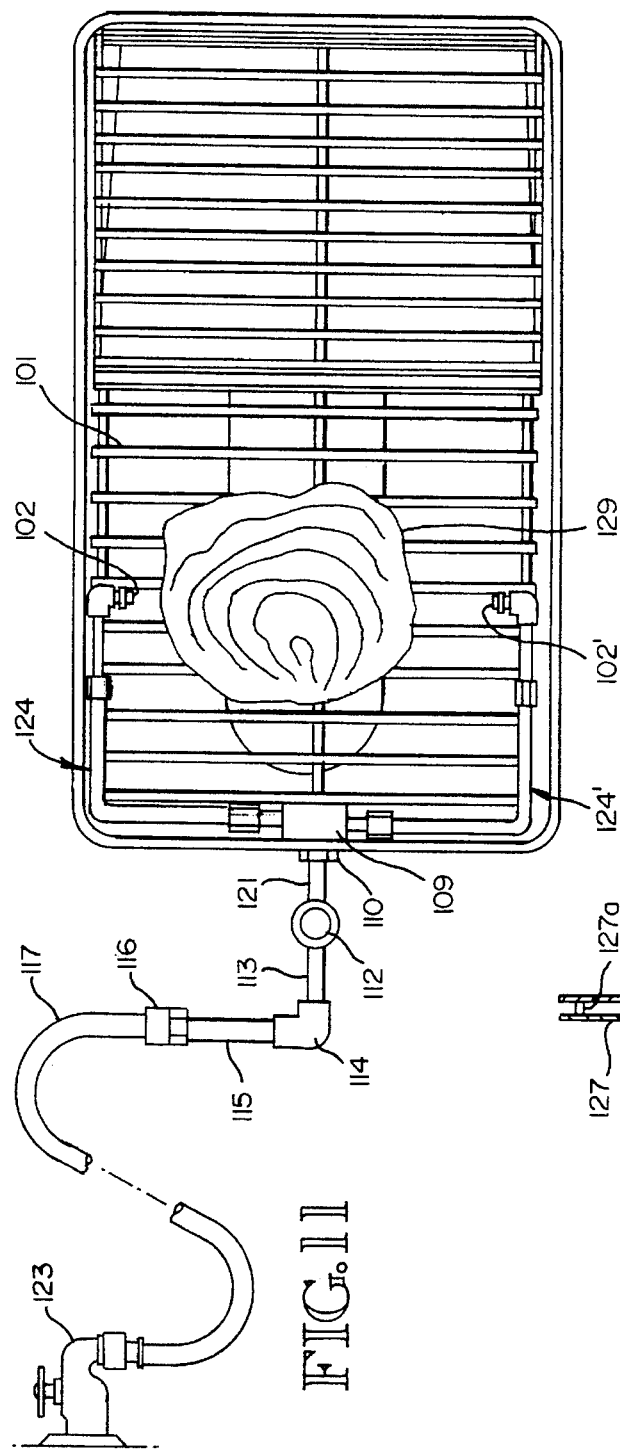
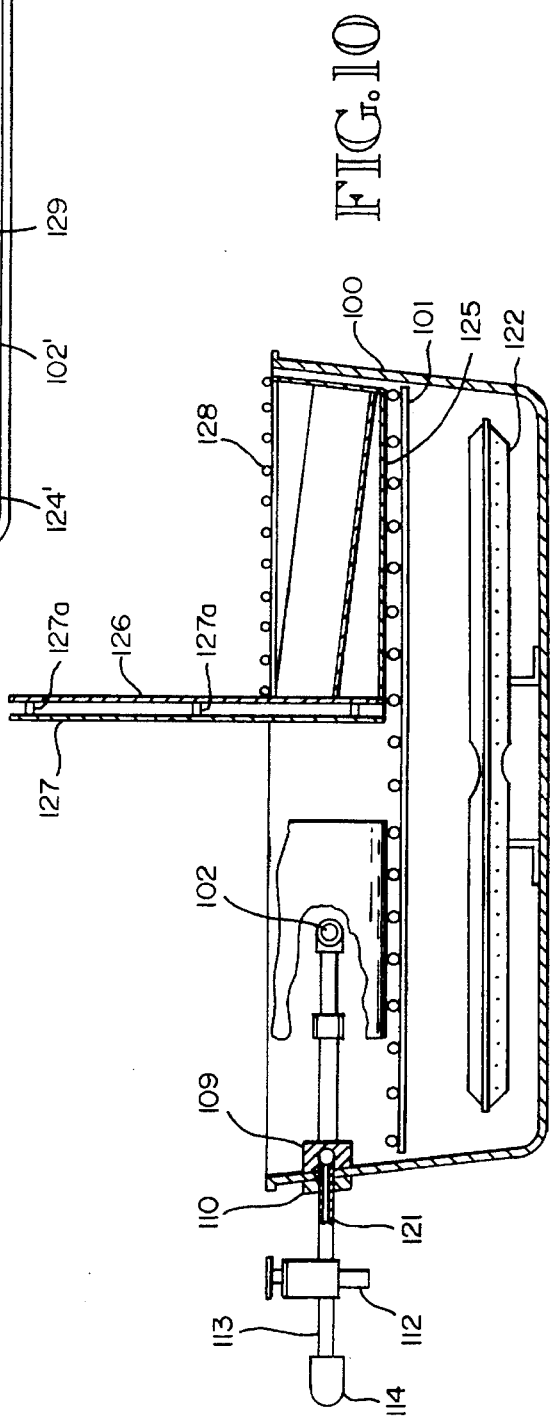
FIG. 11
FIG. 10

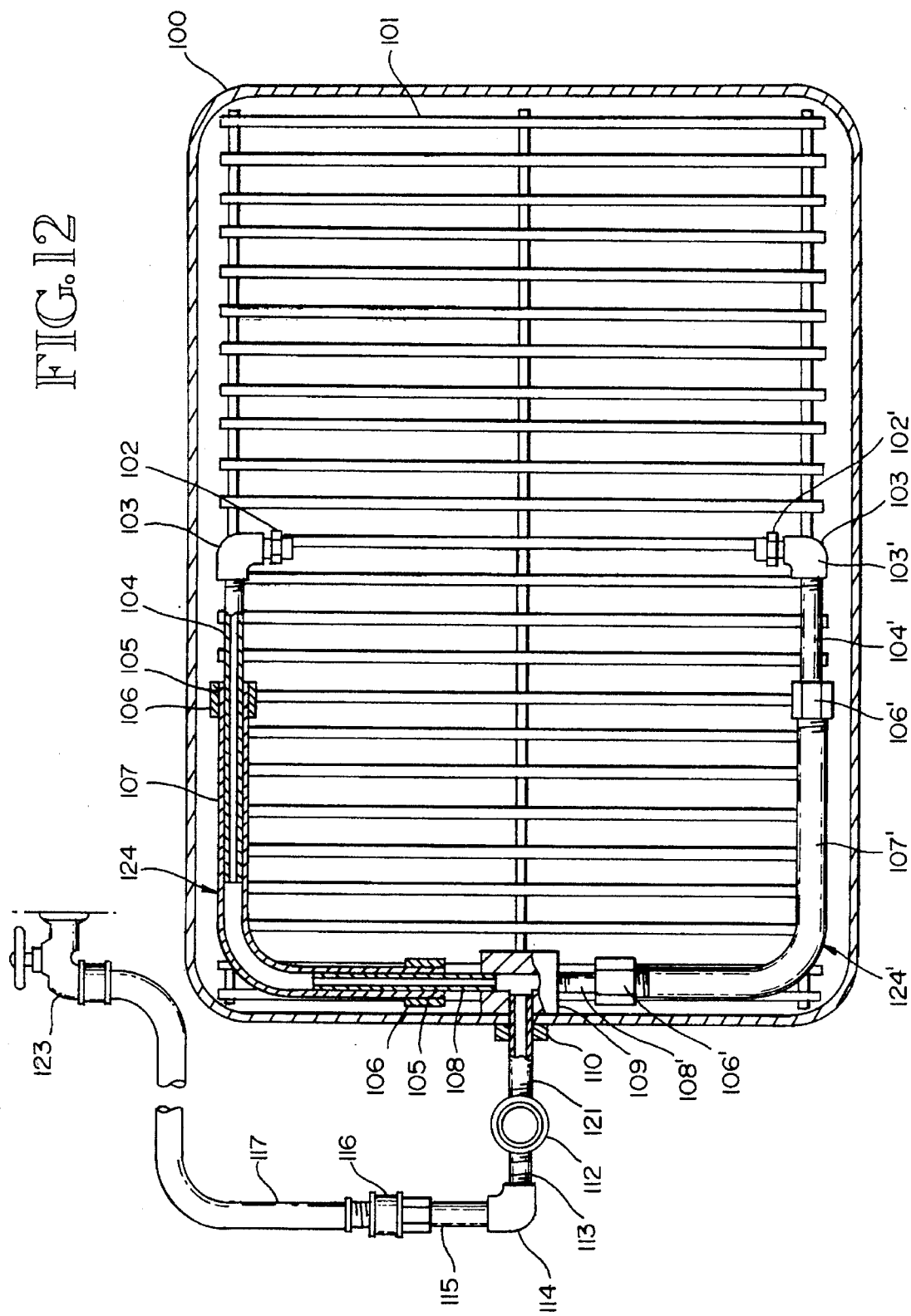

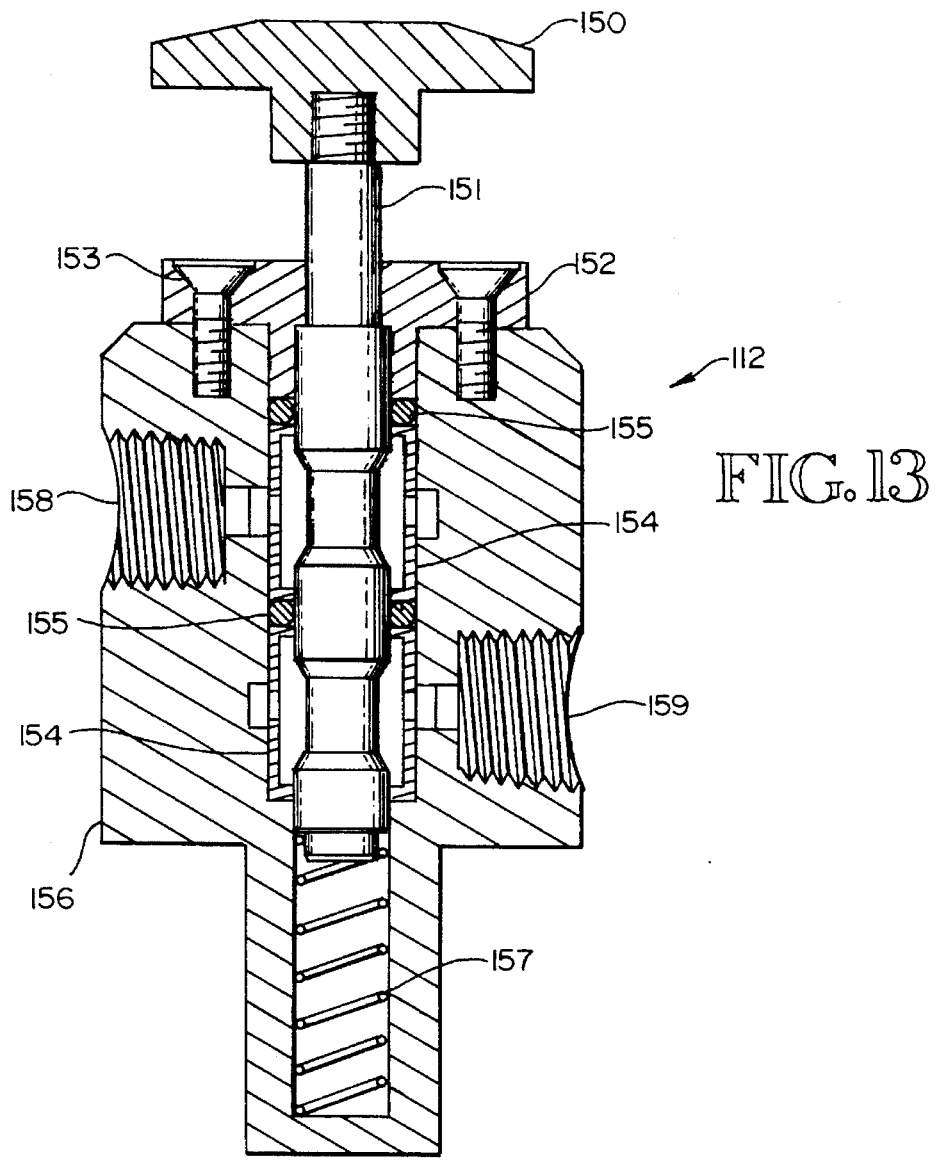
FIG. 13
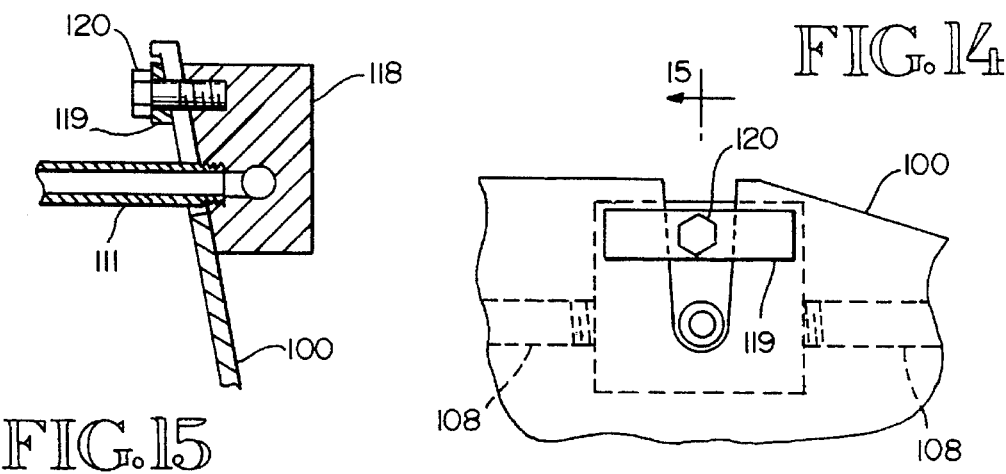
FIG. 14
FIG. 15

5,528,984

SMOKER INSERT FOR GAS BARBECUES

This is a continuation-in-part of U.S. application Ser. No. 08/231,758 filed Apr. 25, 1994, now abandoned.

BACKGROUND OF THE INVENTION

1. Field of the Invention

This invention relates to apparatus for cooking food in a smokey atmosphere. More particularly, this invention relates to food smoking apparatus designed to be used in conjunction with an outdoor barbecue.

2. Brief Description of the Prior Art

Gas burner barbecues have become popular for outdoor cooking of food, particularly meats. The cooking of smoked meats, however, has not been accommodated nearly as well for the backyard cook. The typical backyard smoker for cooking meat in a smokey atmosphere is a cumbersome device that is not nearly as handy as the typical barbecue grill.

SUMMARY OF THE INVENTION

It is a primary object of the present invention to combine the convenience of a barbecue grill with a meat smoker to enable the backyard cook to conveniently cook meat by either barbecuing or smoking. The invention provides an apparatus that may be conveniently inserted into a barbecue compartment for smoking meats. The smoker insert is particularly suited for use in conjunction with a two-burner gas barbecue.

The invention comprises apparatus for smoke-cooking food products such as meat and similar foods which comprises: means providing a cooking compartment having one part for containing a block of wood and heating means for heating the wood block to a temperature sufficient to produce heated wood smoke, and having another part for receiving a smoke-cooking insert; and smoke-cooking insert means removably located in the second part of the cooking compartment and providing drip pan means. The insert means may include a cooking compartment baffle means, the cooking compartment baffle means subdividing the cooking compartment into the first and second parts, with the baffle means and the drip pan means and the cooking compartment means being constructed and arranged whereby food to be smoke-cooked may be placed in the second part of the cooking compartment above the drip pan means and a block of wood may be placed in the first part of the cooking compartment and heated to a smoke-producing temperature, and whereby heated smoke is directed by the baffle means to circulate around and into the second part of the cooking compartment so as to smoke-cook the food.

The means providing a cooking compartment is preferably a gas barbecue which comprises a lower shell and a hinged top having a cooking compartment therein, a gas burner assembly, a lower grate supported within the lower shell, and an upper rack supported within the lower shell. The smoke-cooking insert means is preferably designed to be locatable on the lower grate beneath the upper rack.

BRIEF DESCRIPTION OF THE DRAWINGS

FIG. 8 is side elevation view of the smoker insert embodiment depicted in FIG. 7;

FIG. 9 is an end elevation view of the FIG. 8 smoker insert;

FIG. 10 is a side cross-section view of a gas barbecue illustrating a flame suppression system for use in conjunction with a barbecue smoker insert;

FIG. 11 is a top plan view of the FIG. 10 system;

FIG. 12 is a top plan view of the flame suppression system with the smoker insert removed for clarity;

FIG. 13 is a vertical cross-section view of a water control valve for use with the flame suppression system of FIGS. 10–12;

FIG. 14 illustrates an alternate mode of attachment of the flame suppression system to a barbecue shell; and FIG. 15 is a cross-section taken along the line 15—15 of FIG. 14.

DESCRIPTION OF THE PREFERRED EMBODIMENT

Figure 1:
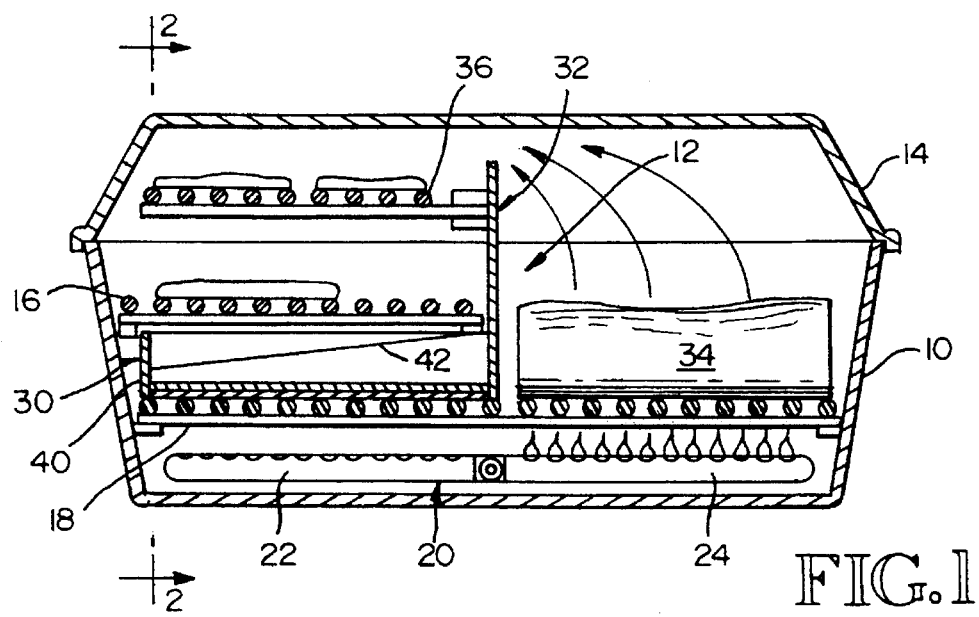
FIG. 1 is a cross-section view of a two burner gas barbecue illustrating the arrangement of the various parts of the invention.
Figure 2:
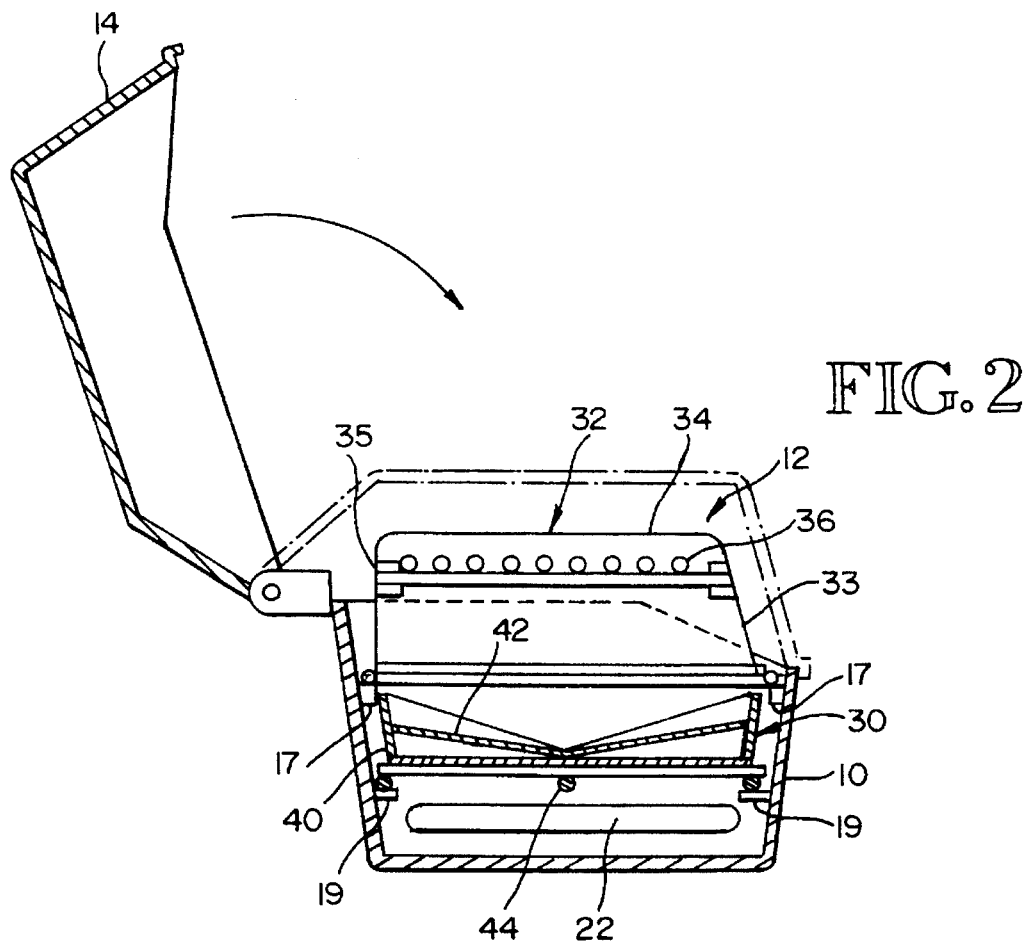
FIG. 2 is a cross-section view taken along the lines 2—2 of FIG. 1.

A typical two-burner gas barbecue comprises a lower shell 10 providing a cooking compartment 12 and an upper lid 14, hinged at the rear, that is designed to close over the cooking compartment to entrap heat within the cooking compartment. The lower shell 10 is typically provided with an upper rack 16 upon which food to be barbecued is placed. The lower shell 10 also is typically provided with a lower grate 18 upon which a material, such as lava rock, is placed for catching and vaporizing meat drippings and for uniformly-distributing heat that is generated from below. Below the lower grate 18, a gas burner assembly 20 is positioned. The gas burner assembly 20 typically provides two separately-ignitable gas burner elements 22, 24 controllable from a front operator's control panel 26. These gas burner elements 22, 24 may be self-igniting or manually-ignitable. The upper and lower grates 16, 18 are typically supported by lugs 17, 19 or brackets extending from the lower shell 10 into the cooking compartment for that purpose.

When barbecuing large portions of meat, such as a roast, with the lid 14 closed, the cooking compartment 12 obviously includes the space enclosed by the lid 14 as well as the space within the lower shell 10. So, the "cooking compartment" is, simply-stated, merely the space within the barbecue wherein food to be cooked is contained. In addition to being supported on the upper rack 16, food may be supported on a rotisserie (not shown) extending above the elevation of the upper rack 16, or at some other location below the upper rack 16 but above the lower grate 18.

The smoker insert of the present invention comprises a drip pan 30 designed to be supported by the lower grate 18, and a vertical baffle 32 extending from the drip pan upwards to subdivide the cooking compartment 12. The drip pan 30 is sized to fit on about ½ of the lower grate area so that the baffle 32 subdivides the cooking compartment about in half, and so that the sides of the drip pan are close to the inner surface of the lower shell 10. The baffle 32 occupies a very substantial portion of the cross-section of the cooking compartment so that the side and top edges 33, 34, 35 of the baffle are close to the inner surfaces of the lower shell 10 and the closed lid 14. By this arrangement, a small clearance is provided around the drip pan 30 and the baffle 32, between the insert and the inner surfaces of the lower shell 10 and closed lid 14.

The drip pan 30 is sized to have a depth less than the distance between the upper and lower grates, 16, 18. Therefore, the upper rack 16 may be supported normally by its supporting lugs 17 from the lower shell 10. Food to be smoke-cooked may, therefore, be placed on the upper rack 16 and the drippings from the smoke-cooking process may be caught by the underlaying drip pan 30.

By occupying only about ½ the area of the lower grate 18, the remaining area of the lower grate is available for supporting a block of wood 34. By igniting the burner element 24 beneath the wood block 34, the wood block may be heated so as to generate the smoke necessary to accomplish smoke-cooking. The heated smokey atmosphere thus generated will circulate throughout the cooking compartment 12, passing from the portion containing the wood block 34, around the baffle 32 and the drip pan 30, and through the clearance around the drip pan and the baffle to circulate in the other portion of the cooking compartment above the drip pan 30. The configuration of the drip pan and baffle cause the heated smoke to rise upward from the wood block 34 and around the baffle, down and around and through the other portion of the cooking compartment, and down through the lower grate 18 and back to the cooking compartment portion that contains wood block 34. This continuous circulation brings fresh smoke into contact with the food being smoke-cooked. This continuous circulation also maintains a more uniform cooking temperature and promotes cooking by convection heating. In a gas barbecue having a double element gas burner assembly, setting the gas burning element beneath the wood block 34 on a low setting will generate a smoke-cooking temperature of about 225° F.

The standard double element gas barbecue comes with a meat rack, e.g. upper rack 16, that fits across the opening and sets on lugs at the front and back of the burner box casing. If this rack is full length and not two racks, it must be cut in half, cross-wise. (Alternatively, the insert could be provided with a meat rack that would be positioned across the drip pan 30, similarly to the upper rack 16, and the barbecue's meat rack could be set aside when the smoker insert is employed.) The insert is placed in the barbecue, on the lower grate 18, and the meat rack is set across the insert's drip pan. Meat to be smoked would be placed on the meat rack and the wood block would be burned to produce smoke by lighting only the gas burner underneath the wood block.

If small pieces of meat are to be smoked, such as fish, the insert may be provided with its own meat rack, e.g. top grate 36, positioned above upper rack 16. The upper meat rack 36 is supported by slotted lugs 38 in the baffle 32 and it cantilevers over the insert's drip pan. Using both the barbecue's meat rack 16 and the upper meat rack 36, several items can be smoked at once. For smoking a larger piece of meat, such as a half turkey, the upper meat rack 36 would be removed and set aside, and only the barbecue's meat rack 16 would be used.

The insert's drip pan 30 comprises a rectangular skirt 40 that holds a V-shaped bottom 42. The skirt's sides are tapered inward. to match the slope of the front and back walls of the barbecue's lower shell 10, and the skirt ends are vertical The bottom 42 slopes from the front and back sides toward the middle; and also slopes from the baffle side toward its outer end. At its lowest point, the bottom (at the middle of its outer end) may be provided with a capped drain port 44 so that the drippings can be collected and drained off through the drain port. The insert's baffle continues up beyond the drip pan 30 to provide the height necessary for supporting the upper meat rack 36. Also, this baffle provides a diversion plate that diverts the smoke around the zone where the meat will be smoked. The member providing baffle 30 preferably is one piece and forms one end of the drip pan and one side of the drip pan's skirt. The other three sides of the drip pan skirt are either formed of one piece or fastened together, as by welding, and secured to the baffle member, also as by welding.

The smoke-cooking insert of this invention is preferably provided as an auxiliary device for use in conventional two-burner gas barbecues. Alternately, a specialized apparatus could be constructed to provide a cooking compartment subdivided and providing for means to support the insert on one side and a wood block on the other side, and to provide means for heating the woods block to a temperature sufficient to produce wood smoke heated high enough to accomplish smoke-cooking, and to provide a meat rack on which food, to be smoke-cooked, could be placed overlaying the insert's drip pan.

A typical two burner gas barbecue might have a lower shell that is about 9¼ inches wide by 20 inches long; a lower grate supported about 2¾ inches above the shell bottom, an upper meat rack supported about 6 inches above the shell bottom, and a top hinged cover having a top surface positioned about 6 inches above the top edge of the lower shell. For such a barbecue, the smoke-cooking insert might have a drip pan about 3 inches deep and 8 inches wide by 8 inches long. The smoke-cooking insert's baffle would have its edges formed to generally parallel the inner surfaces of the lower shell side walls and the inner surface of the top cover so that a clearance of about 1 inch would exist around the baffle's side and top edges.

Figure 7:
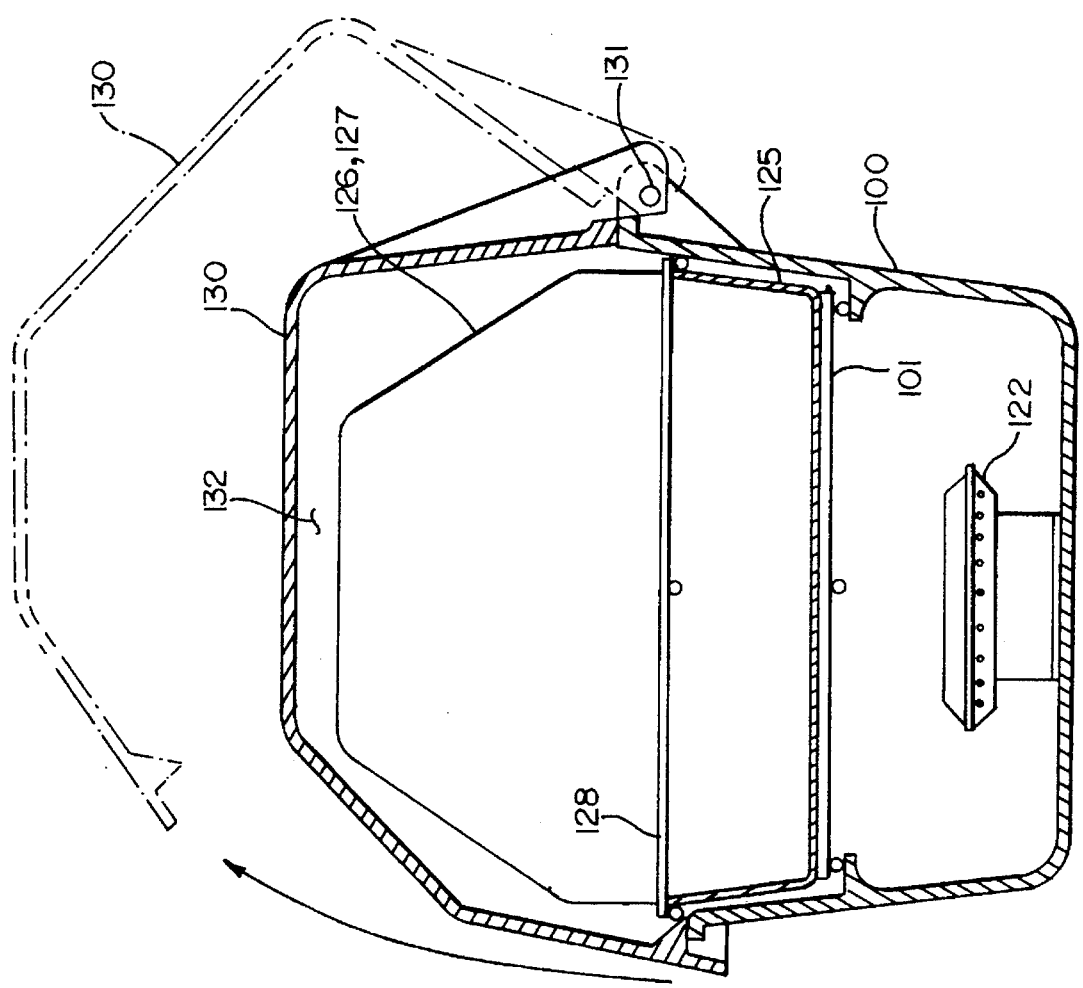
FIG. 7 is a cross-section, similar to FIG. 2, illustrating another embodiment of the smoker insert of this invention.

Referring specifically to FIGS. 7–9, a preferred form of the smoker insert is illustrated wherein the insert's baffle plate 126 is supplemented by a parallel plates 127 that is separated from baffle plate 126 by short spacers so that a dead air space is between the adjacent surfaces of the two baffle plates. Plate=126 is joined to the insert's drip pan 125. The short spacers 127a join the two baffle plates at selected locations around the edges of the two plates. The provision of two baffle plates with an intervening dead air space reduces the radiant heat gradient close to the baffle so that food placed on the insert's rack 128 would not over-cook. In the absence of providing the baffle with radiant heat insulating qualities, there may be a tendency for undue radiant heat cooking of food closer to the baffle, compared with the heated smoke cooking by convection to which the rest of the food would be subjected. An air gap between the two baffle plates of ¼ inch is sufficient. Alternately, the gap between the baffle plates could be filled with some sort of heat-resistant solid insulation if desired. The peripheral configuration of the baffle plates is shaped in any convenient pattern so that heated smoke passage is permitted around the sides and the top of the baffle. FIGS. 7 and 9 illustrate two preferred shapes that are symmetrical so that the insert can be positioned in either half of the barbecue; the symmetry permitting either insert baffle side to be positioned toward the front or toward the back of the barbecue. With either preferred shape, the baffle plates easily fit within the confines of the barbecue's lid 130 as hinged at 131 from the shell 100, with adequate clearance 132 being provided between the baffle plate peripheral edge and the cover 130.

Referring now to FIGS. 10–12, the flame suppression system provides a water metering valve 112 that controls water flow from an external source, such as a hose bib 123, to misting spray nozzles 102, 102'. In this system, water from hose bib 123 is directed through a garden hose 117, hose-pipe coupling 116, pipe 115, elbow 114, valve infeed pipe 113, control valve 112, valve outflow pipe 110 and into a water distribution block 109. From block 109, water is directed through two water distribution branch tube assemblies 124, 124' that consist of sections 108–108', 107–107', and 104–104', through elbows 103, 103' and through misting spray nozzles 102, 102' into the interior of the barbecue shell 100. Infeed water is sprayed as a mist into the compartment below the cooking rack 101 so as to quench flames and flame flare-ups that occur as a result of drippings from the cooking food dropping or splattering on hot surfaces, such as the sides and bottom of the barbecue shell or on the wood block 129 or the gas burner elements 122.

The flame suppression system of this invention simply screws onto a standard garden hose, fits inside the barbecue unit, and instantly extinguishes flare-ups and flames with just the touch of the control valve. A fine mist is emitted in the right places within the barbecue unit and quickly puts out only the unwanted fire. There is no mess and very little, if any, run-off water as it is mostly vaporized by the heat. An added benefit is that this misting, flame-suppressant process incorporates steam with the heat and smoke to tenderize the food and enhance the flavor.

To accommodate various positions for the misting nozzles 102, 102', such as would be required for adapting the flame suppression system to barbecues having different widths and lengths, pipe sections 107, 107' telescope within their respective upstream pipe sections 108, 108' and pipe sections 104, 104' telescope within their respective upstream pipe sections 107, 107'. The telescopic joints between the telescopic pipe sections is provided by compression nuts 106, 106' and 106a, 106a'. The compression nuts encircle the larger pipe section and thread over threaded ends of the smaller pipe section, with suitable seal rings 105 making the joints water-tight. When a particular compression coupling, such as 106, is loosened, the inner pipe, such as 107, can be extended further out of or into its larger pipe, such as 108, from the location shown in the drawings. Thus, with respect to couplings 106, 106', the effective distance between the two pipe branches 107, 107' can be increased or decreased. With respect to couplings 106a, 106a', the effective length of the pipe branches 104, 104' can be increased or decreased.

Thus, for example, the effective length of the pipe branches could be shortened so as to locate the misting nozzles 102, 102' in the part of the barbecue compartment that contains the wood block 129 as seen in FIG. 11. Or, for example, the effective length of the pipe branches could be lengthened so as to locate the misting nozzles 102, 102' midway along the sides of the barbecue compartment as seen in FIG. 12. Consequently, the flame suppression system can be accommodated to use when the barbecue is used in conjunction with the smoke cooking insert (FIG. 11), and to use when the barbecue is used in its customary mode (FIG. 12).

Because the misting nozzle connection to the piping is by means of elbows 103, 103' and telescopic pipe sections 104, 104' that are held in position by means of compression couplings 106a, 106a', the spray orientation of the misting nozzles 102, 102', upward or downward, can be adjusted. This adjustment would be made by loosening a coupling, such as 106a, and then rotating the respective smaller pipe section, such as 104', so as to swivel the respective nozzle head 102 upward or downward, as desired. In addition to being able to orient the spray direction of the nozzles 102, 102' by rotating the pipe sections 104, 104' in their respective couplings 106a, 106a', the elevation of the nozzles can be adjusted upward or downward. This adjustment would be made by loosening a coupling, such as 106, and then rotating the respective smaller pipe section, such as 107, so as to swivel the pipe branch of pipe 104 upward or downward, as desired. Thus, a nozzle elevation from near to the bottom grate 101 or near to the cooking rack 101 can be achieved, and—depending on the nozzle elevation—the spray direction or orientation of the nozzle can be adjusted to that desired.

The adjustability of the system, both as to its branch width and length and as to its nozzle elevation and orientation, enables the provision of a standard set of system components that can fit a wide variety of barbecue compartment widths, lengths and depths and barbecue compartment uses.

A typical distribution block-to-barbecue shell installation is illustrated in FIGS. 10–12. This installation requires the drilling of a hole through the top edge of one end of the barbecue shell 100 so that pipe section 121 and be inserted through that hole with the distribution block 109 located against the inside wall of the compartment 100 and the control valve located outside of the compartment. A locking nut 110, encircling the pipe section 110 outside of the compartment would be tightened, on threads provided therefor on pipe section 110, against the compartment outer wall so as to clamp the distribution block firmly in place.

An alternative mounting is illustrated in FIGS. 14 and 15 where a conventional barbecue's rotisserie shaft notch 100a is bracketed by the distribution block 118 and a clamp bar 119 that is brought into clamping engagement with the outside of the barbecue compartment end wall by means of a screw that is threaded into distribution block 118. Both pipe section 111 and screw 120 pass through the rotisserie shaft notch 100a as shown.

The parts of the flame suppression assembly located within the compartment 100 are fabricated of steel, stainless steel being preferred, so as to be resistant to the heated environment within the compartment. The parts of the assembly located outside of the compartment may be made of steel or, alternately, of heat resistant plastic.

The water infeed elbow 114 is preferably oriented so that infeed pipe 115 extends vertically so that the weight of hose 117, that is attached to the assembly, will exert only a downward force on the piping and not a force moment that would place a rotational force on the piping. Having the hose connection 116 below the elbow 114 places that connection out of the way so that there is less likelihood of a person tripping over the hose 117. The orientation of parts 116, 115, 114 is illustrated in the Figures as being horizontal merely for the sake of illustration and explanation of their function in the system.

FIG. 13 illustrates a preferred water infeed control valve for the flame suppression system of this invention. This valve 112 comprises a valve body 156 ported with threaded ports 158 for water infeed and 159 for water outflow to the barbecue unit, a valve spool cavity appropriately lined by cylindrical lining 154 that spaces valve bearing seals 155, a return spring cavity containing a coil compression spring 157, a valve spool extension 151 mounting a valve push pad 150, a valve spool cavity cap 153, and a valve spool 160. The valve spool 160 is provided with appropriate lands as shown to normally close the outflow port 159 from the infeed port 158. When the valve pad 150 is pressed downward, the valve spool 160 is shifted downward to clear its middle land from the mid-seal ring 155 so as to permit water flow from port 158 through the valve spool cavity and out through port 159. When the valve pad 150 is released, the spring force of spring 157 returns the valve spool to the position shown in FIG. 13.

The flame suppression system of this invention is designed to be operated with normal residential water pressure. At that pressure, typically ranging from about 30 psi to about 80 psi, a momentary depression and release of the valve pad 150 will release enough water under pressure into the piping branches to the misting nozzles 102, 102' to create a fine mist within the compartment 100 so as to quench flames or flame flare-ups. A user would soon learn how to "bump" the valve pad 150 downward with a quick depression and release to effect the degree of suppression desired. With the system of this invention, a user would tend to find that several quick "bumps" on the valve pad 150 would effect any desired quenching during a barbecue or smoke-cooking operation, and would be a preferred technique as opposed to exerting one longer depression of the valve pad so as to effect a longer continuous period of misting. The nozzles exert a sufficient back pressure that any depression of the valve pad 150 will effect a seemingly instantaneous mist being sprayed through the nozzles. There will not be a significant lag between the depression of the valve pad 150 and the effecting of a misting spray under normal operating conditions.

Figure 3:
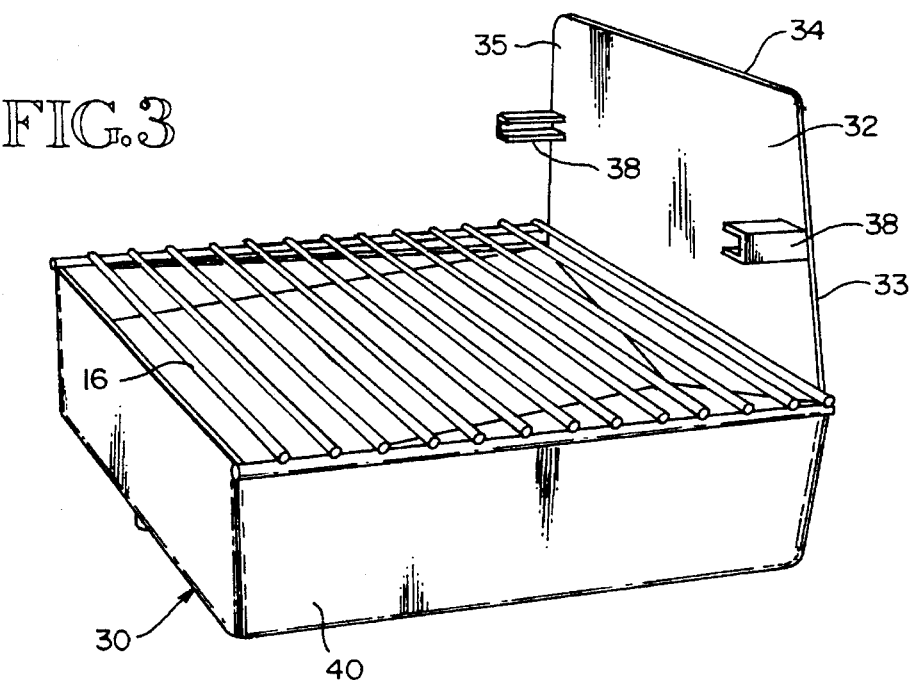
FIG. 3 is side perspective view of the insert of this invention.
Figure 4:
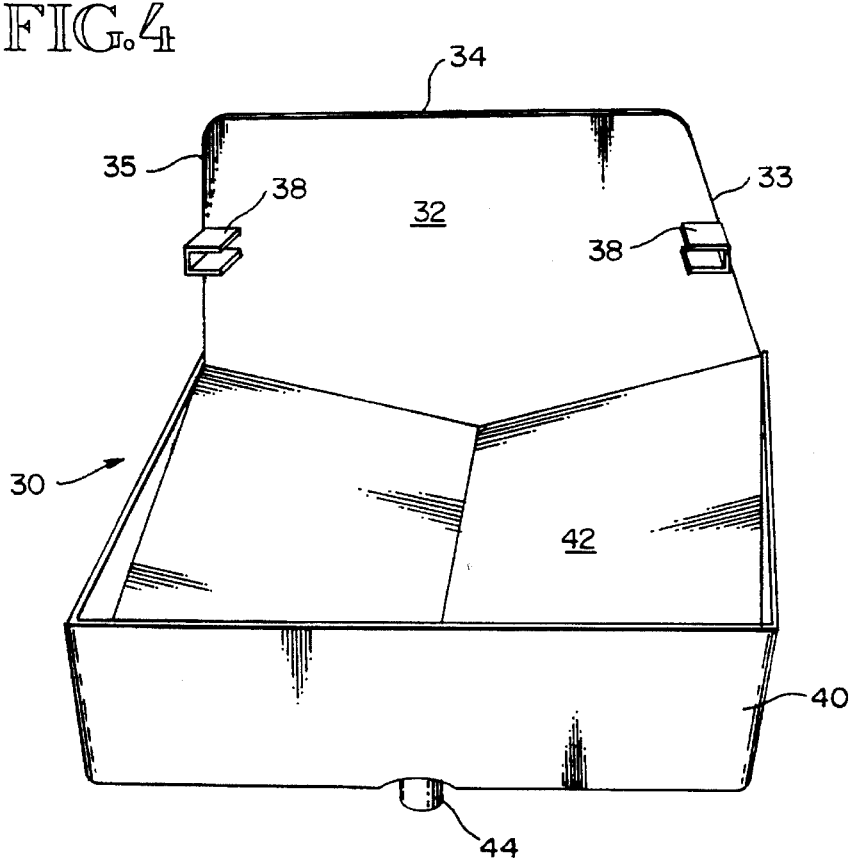
FIG. 4 is an end perspective view of the insert of this invention.
Figure 5:
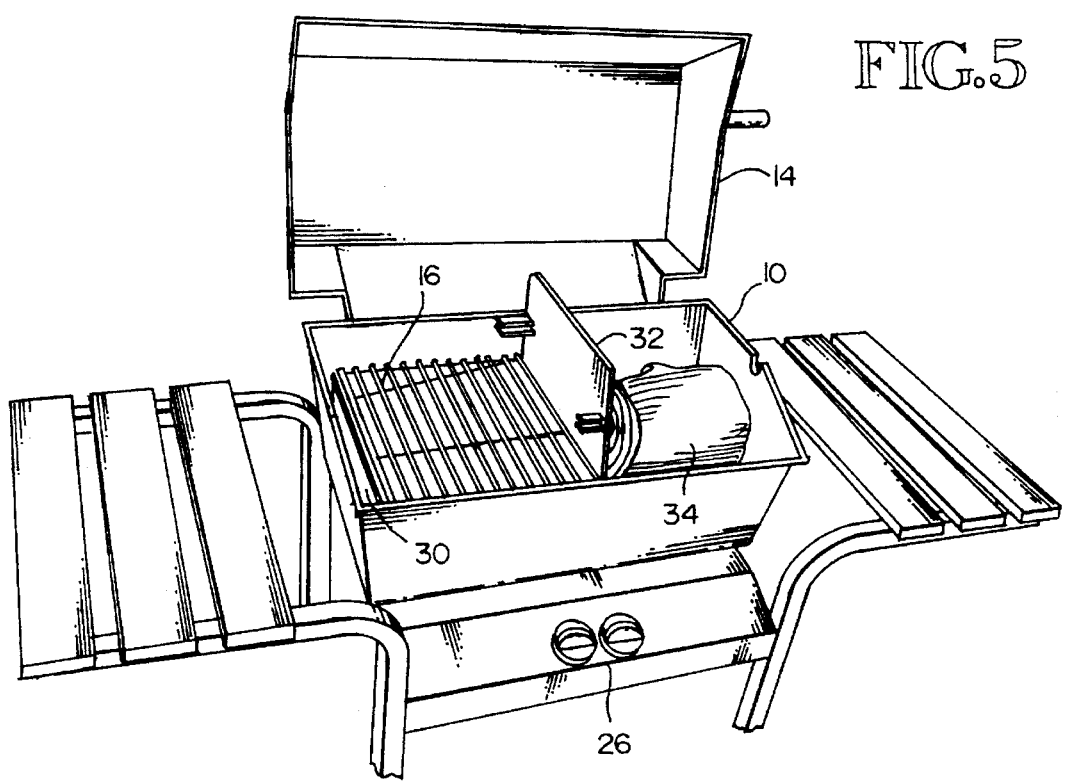
FIG. 5 is a front perspective view of a two burner gas barbecue illustrating the insert of this invention setting within the barbecue with its top meat rack removed, and with a block of wood also setting in the barbecue.
Figure 6:
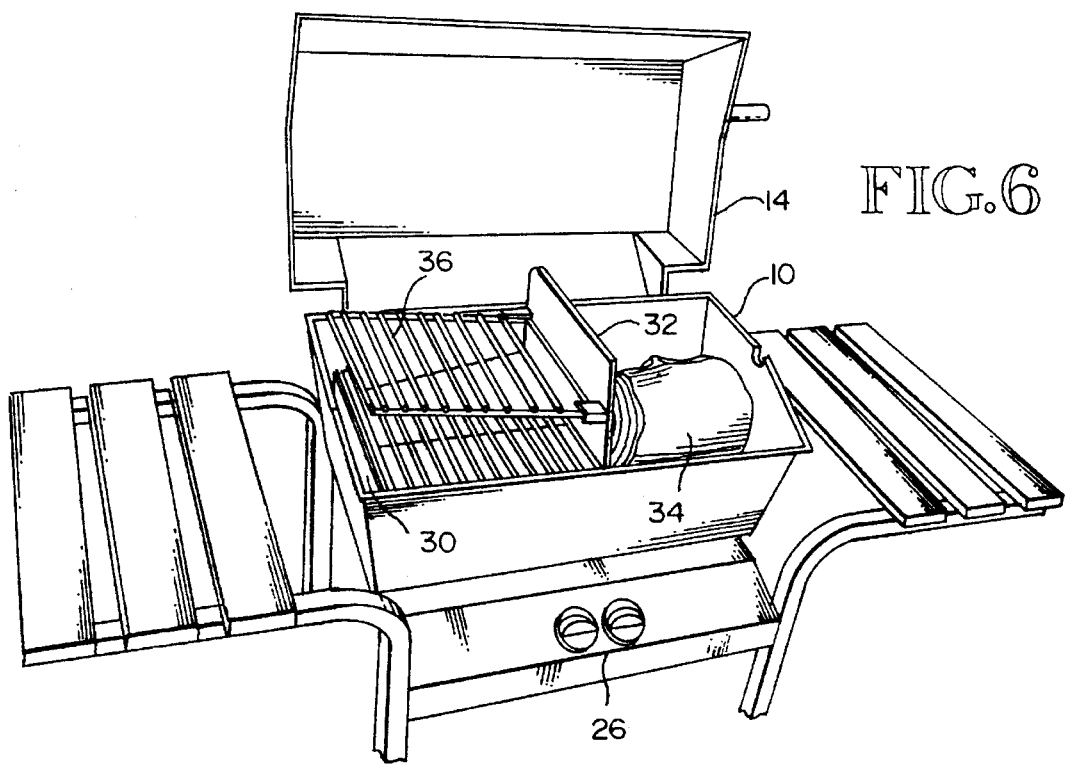
FIG. 6 is a front perspective view of the FIG. 5 barbecue illustrating the insert of this invention with its top meat rack installed.

While the preferred embodiment of the invention has been described herein, variations in the design may be made. For example, in the absence of baffle 32, where it is desired that means be provided for supporting upper meat rack 36, a pair of vertical posts might extend upward from pan 30 and slotted lugs 38 (or their equivalent) could be provided on the posts. Furthermore, as shown in FIG. 3, the upper rack 16 may be sized to set upon the upper edges of the drip pan 30, rather than be supported from the lower shell 10. Rather than using a wood block 34 as a source of heated smoke, it would be suitable to provide a pan containing wood chips; the pan of wood chips would then occupy the position of the wood block shown in the drawings, and the burner element below would be adjusted to provide sufficient heat to cause the wood chips to smolder and produce the requisite heated smoke. The scope of the invention, therefore, is only to be limited by the claims appended hereto.

The embodiments of the invention in which an exclusive property is claimed are defined as follows:

In the claims:

1. In combination with a gas barbecue which comprises a lower shell and a hinged top having a cooking compartment therein, a gas burner assembly, and a lower grate supported within said lower shell, the improvement comprising:

removable smoke-cooking insert means locatable on said lower grate said smoke-cooking insert means comprising a drip pan means, a food-supporting rack means and a cooking compartment baffle means, said cooking compartment baffle means subdividing said cooking compartment into first and second parts, and said drip pan means and said food-supporting rack means being constructed and arranged whereby food to be smoke-cooked may be placed in said second part of said cooking compartment on said rack means and above said drip pan means and a source of wood may be placed on said lower grate in said first part of said cooking compartment and heated to a smoke-producing temperature, and whereby heated smoke is directed to circulate around and into said second part of said cooking compartment so as to smoke-cook said food, said cooking compartment baffle means being mounted on said drip pan means so as to be removable therewith, and said cooking compartment baffle means having a periphery located adjacent to but spaced from the lower shell and hinged top of said gas barbecue such that heated smoke may freely circulate around said periphery between said cooking compartment baffle means and said lower shell and said hinged top.

2. The apparatus of claim 1 wherein said drip pan means comprises skirt means, and bottom means supported by said skirt means and sloped to one end for collection of drippings resulting from smoke-cooking food.

3. The apparatus of claim 1 wherein said cooking compartment baffle means comprises a first baffle plate attached to said drip pan means, and a second baffle plate attached to said first baffle plate and spaced therefrom so as to provide an insulating spaced between the two baffle plates to reduce radiant heat transfer from said first baffle plate.

4. The apparatus of claim 1 including flame suppression means providing at least one water spray nozzle disposed within said cooking compartment and oriented to spray a water mist into said cooking compartment to quench flames and flame-ups, a tubing means communicating said spray nozzle with a control valve means, control valve means connected to said tubing means, and water connection means connected to said control valve means and adapted to be connected to a source of water.

5. The apparatus of claim 4 wherein said flame suppression means includes two water spray nozzles and water distribution means, said water distribution means being connected to said control valve means; and wherein said tubing means comprises a pair of telescopic branch tubing assemblies, each branch assembly connecting a spray nozzle to said water distribution means so that water flowing through said water distribution means will be simultaneously sprayed from both spray nozzles.

6. Apparatus for smoke-cooking food products such as meat and similar foods which comprises:

means providing a closed cooking compartment defined by top, bottom and side walls, said closed cooking compartment having a first part for containing a source of wood and heating means for heating the wood to a temperature sufficient to produce heated wood smoke, and having a second part for receiving a smoke-cooking insert means;

removable smoke-cooking insert means locatable on said lower grate said smoke-cooking insert means comprising a drip pan means, a food-supporting rack means and a cooking compartment baffle means, said cooking compartment baffle means subdividing said cooking compartment into said first and second parts, and said drip pan means and said food-supporting rack means being constructed and arranged whereby food to be smoke-cooked may be placed in said second part of said cooking compartment on said rack means and above said drip pan means and a source of wood may be placed on said lower grate in said first part of said cooking compartment and heated to a smoke-producing temperature, and whereby heated smoke is directed to circulate around and into said second part of said cooking compartment so as to smoke-cook said food, said cooking compartment baffle means being mounted on said drip pan means so as to be removable therewith, and said cooking compartment baffle means having a periphery located adjacent to but spaced from the top, bottom and side walls of said cooking compartment such that heated smoke may freely circulate around said periphery between said cooking compartment baffle means and said top, bottom and side walls.

7. The apparatus of claim 6 wherein said drip pan means comprises skirt means secured to said baffle means, and bottom means supported by said skirt means and sloped to one end for collection of drippings resulting from smoke-cooking food.

8. The apparatus of claim 6 wherein said cooking compartment baffle means comprises a first baffle plate attached to said drip pan means, and a second baffle plate attached to said first baffle plate and spaced therefrom so as to provide an insulating spaced between the two baffle plates to reduce radiant heat transfer from said first baffle plate.

9. The apparatus of claim 6 including flame suppression means providing at least one water spray nozzle disposed within said cooking compartment and oriented to spray a water mist into said cooking compartment to quench flames and flame-ups, a tubing means communicating said spray nozzle with a control valve means, control valve means connected to said tubing means, and water connection means connected to said control valve means and adapted to be connected to a source of water.

10. The apparatus of claim 9 wherein said flame suppression means includes two water spray nozzles and water distribution means, said water distribution means being connected to said control valve means; and wherein said tubing means comprises a pair of telescopic branch tubing assemblies, each branch assembly connecting a spray nozzle to said water distribution means so that water flowing through said water distribution means will be simultaneously sprayed from both spray nozzles.

* * * * *